(12) United States Patent
Hamilton et al.

(10) Patent No.: US 12,502,811 B2
(45) Date of Patent: *Dec. 23, 2025

(54) METHOD AND APPARATUS FOR CURING A COMPOSITE ARTICLE

(71) Applicant: SPIRIT AEROSYSTEMS (EUROPE) LIMITED, London (GB)

(72) Inventors: Andrew W. Hamilton, Glasgow (GB); Christos Tachtatzis, Glasgow (GB)

(73) Assignee: SPIRIT AEROSYSTEMS (EUROPE) LIMITED, London (GB)

( * ) Notice: Subject to any disclaimer, the term of this patent is extended or adjusted under 35 U.S.C. 154(b) by 298 days.

This patent is subject to a terminal disclaimer.

(21) Appl. No.: 17/893,939

(22) Filed: Aug. 23, 2022

(65) Prior Publication Data
US 2022/0402173 A1   Dec. 22, 2022

Related U.S. Application Data

(63) Continuation of application No. 16/062,514, filed as application No. PCT/GB2018/051330 on May 16, 2018, now Pat. No. 11,453,148.

(30) Foreign Application Priority Data

Jul. 21, 2017 (GB) .................................. 1711775

(51) Int. Cl.
*B29C 35/02*   (2006.01)
*B29C 70/54*   (2006.01)
(Continued)

(52) U.S. Cl.
CPC ...... *B29C 35/0288* (2013.01); *B29C 35/0272* (2013.01); *B29C 70/54* (2013.01);
(Continued)

(58) Field of Classification Search
CPC . B29C 35/0288; B29C 35/0272; B29C 70/54; B29K 2063/00; B29K 2105/0845; B29K 2307/04; C08J 5/24
(Continued)

(56) References Cited

U.S. PATENT DOCUMENTS

| 5,345,397 A * | 9/1994 | Handel ............... B29C 35/0288 425/30 |
| 2005/0173820 A1* | 8/2005 | Schneider .......... B29C 35/0288 264/236 |

FOREIGN PATENT DOCUMENTS

JP          2000132240 A   *   5/2000

OTHER PUBLICATIONS

Abe, JP 2000-132240 A machine translation in English, May 12, 2000. (Year: 2000).*

* cited by examiner

Primary Examiner — David T Karst
(74) Attorney, Agent, or Firm — Stinson LLP (57) ABSTRACT

Disclosed is a method of curing a composite article and associated curing apparatus. A heat source is provided for heating the composite article. A temperature related property is detected proximal to the heat source and the heat output is regulated to a predetermined temperature vs. time profile. Heat output vs time data is acquired and functionalised and the curing completion time is determined based on the functionalised heat output vs time data. The method provides for heating a composite article so as to follow a predetermined temperature vs. time profile (i.e. a cure profile) and avoid excessively high temperatures. The required heat output vs time has also been found to be broadly reproducible, and the curing completion time can be more readily determined from functionalised heat output vs time (Continued)

data, for example by identifying reproducible characteristics of the functionalised data.

22 Claims, 5 Drawing Sheets

(51) Int. Cl.
*C08J 5/24* (2006.01)
*B29K 63/00* (2006.01)
*B29K 105/08* (2006.01)
*B29K 307/04* (2006.01)

(52) U.S. Cl.
CPC .. *B29K 2063/00* (2013.01); *B29K 2105/0845* (2013.01); *B29K 2307/04* (2013.01); *C08J 5/24* (2013.01)

(58) Field of Classification Search
USPC .......................................................... 523/222
See application file for complete search history.

METHOD AND APPARATUS FOR CURING A COMPOSITE ARTICLE

CROSS-REFERENCED TO RELATED APPLICATIONS

This is a continuation application of U.S. application Ser. No. 16/062,514 filed on Jun. 14, 2018 and entitled "Method and Apparatus for Curing a Composite Article," incorporated by reference herein in its entirety. Furthermore, U.S. application Ser. No. 16/062,514 claims priority to International Application No. PCT/GB2018/051330, filed May 16, 2018, which in turn claims priority from United Kingdom Application No. GB 1711775.5, filed Jul. 21, 2017, the entire disclosures of which are hereby incorporated by reference herein.

FIELD OF THE INVENTION

The invention relates to methods and heated tools for curing articles formed from composite materials such as carbon fibre, in particular for aerospace applications.

BACKGROUND TO THE INVENTION

Composite materials are widely used in a number of industries, such as aerospace, automotive; civil engineering and sports goods, due to their high strength-to-weight ratio.

Carbon fibre composite material (also known as carbon fibre reinforced polymer, or simply "carbon fibre"), is an example of a composite material formed from a fabric or fibrous component reinforced by a polymeric or resin component.

Carbon fibre composite material is formed from layered carbon fibre fabric impregnated with and reinforcing a polymer matrix. The fabric is formed by carbonizing a synthetic polymer fabric material and may be provided in woven, non-woven or may consist of unidirectional fibres. The carbon fibre fabric provides the majority of the composite material's strength, whilst the resin provides additional strength and rigidity and also protects and preserves the mechanical properties of the carbon fibres.

The polymer matrix is typically a thermoset polymer, formed from a resin; commonly an epoxy resin. Whilst the formation of a thermoset polymer from a resin precursor is normally an exothermic reaction, epoxy resin systems used for large scale industrial applications normally require the input of thermal energy to initiate curing, i.e. cross-linking between polymeric chains within the resin, to thereby form three-dimensional polymer matrices.

Conventionally, following lay-up of the fabric and resin impregnation, carbon fibre articles are cured in an autoclave, under high temperature (ca. 100-300° C.) and pressure (up to 7 Bar). Whilst this method of curing is effective, it is associated with high capital expenditure, and high operating costs.

Particularly for the aerospace industry, there has been increasing adoption of so called "out of autoclave" (OOA) curing methods, in which a carbon fibre article is held at a reduced pressure (in a vacuum bag) and cured on a heated tool, or between heated tools.

The initial and operating costs for OOA manufacture are significantly reduced, but problems can be encountered in controlling the curing reaction; in terms of ensuring complete curing throughout large items and/or preventing localised overheating, which can adversely affect the final structural performance of a composite article.

The relevant conditions across the face of a curing tool will be different for each composite article and so, conventionally, OOA curing conditions are determined experimentally, based on differential scanning calorimetry or destructive testing. However, during manufacture, curing cannot be effectively monitored. Due to inherent variations between parts, in ambient conditions, batches of carbon fibre and/or resin and the like, curing conditions must therefore be set conservatively (slow ramp rates, long dwell times) to ensure that overheating or incomplete curing are avoided. This adds to manufacturing time and energy consumption.

In U.S. Pat. No. 8,473,093, Gershenfeld et al. describe how a network of "nodes" might be embedded in an OOA curing tool and subject to closed loop control by a processor, where each node comprises a thermistor or thermocouple, and a heating element. The processor controls the heating input based on detected temperature, in order to follow a predetermined curing temperature profile.

It has been proposed to embed means for detecting temperature within the composite articles themselves, so as to more accurately monitor temperature deep within a composite structure. However, this adds to the cost and complexity of manufacture, and for many applications it is not desirable for the thermocouple/thermistors to be present in the final composite article.

In their proof of concept work, Gershenfeld et al. demonstrate that in principle, a signature of an exothermic curing reaction taking place within a cup of an epoxy resin can be followed based on the excursion of required heating input from that expected, based on comparative tests of an already cured sample. However, this signature was seen in tests conducted using a single node on a sample of bulk resin, and the principle was not tested on a composite material in a curing tool, where the signal would be far lower.

Accordingly, there is a need for improved monitoring and control of curing during OOA composites manufacture.

SUMMARY OF THE INVENTION

According to a first aspect of the invention, there is provided a method of curing a composite article, comprising;
 providing a heat source for heating the composite article;
 detecting a temperature-related property proximal to the heat source;
 regulating the heat output of the heat source to the composite article, based at least in part on the detected temperature-related property, to a predetermined temperature vs. time profile;
 acquiring heat output vs time data; and
 functionalising heat output vs time data; and
 determining a curing completion time based on the functionalised heat output vs time data.

The method provides for heating a composite article so as to follow a predetermined temperature vs. time profile (i.e. a cure profile) and avoid excessively high temperatures.

Deviations observed between the expected required heat output and the actual required heat output to follow a cure profile can be attributed to enthalpy of the curing reaction. The required heat output vs time has also been found to be broadly reproducible, but subject to experimental variations, caused by variations in the amount of resin and the density of the composite article, ambient conditions, the duty cycle of a heating tool, and the like.

It has been found that the curing completion time can be more readily determined from functionalised heat output vs time data (hereinafter referred to as the "functionalised data"

or "F(t)"), such as the first derivative of heat output vs time data, than from the raw heat output vs time data. The functionalised data can therefore assist in more accurately or reliably determining the curing completion time.

The heat output may be a value of an electrical current or power supplied to the heat source.

The method may comprise identifying a reproducible characteristic of the functionalised data, and determining the curing completion time based on the reproducible characteristic.

The functionalising may comprise applying one or more (mathematical) functions to the heat output vs time data.

The functionalised data may be a first derivative of the heat output vs time data (the "first derivative") or a second derivative of the heat output vs time data or indeed a higher order derivative. The reproducible characteristic of the functionalised data may be the said derivative approaching zero. Variations in the offset, i.e. the absolute heat output required to maintain a temperature, thereby need not be accounted for.

For example, the curing completion time may be determined by detecting when the first derivative remains within a threshold range of zero for a predetermined period. The threshold range may be within ±0.1, within ±0.05, within ±0.01, within ±0.005 or within ±0.001. It will be understood that a smaller threshold range will typically correspond to a higher overall degree of curing of the composite material, wherein the acceptable degree of curing will be dependent on each particular application.

The functionalised data may be a square or higher order power, or any suitable mathematical processing suitable to enhance or exaggerate a characteristic of the heat output vs time data.

The functionalised data may be a result of a change detection method applied to the heat output vs. time data, such as a Bayesian change point detection algorithm, k-mean clustering using kurtosis (where each cell would correspond to a particular stage in the cure cycle), subspace modelling, probabilistic methods, machine learning techniques, or other suitable change detection methods as known in the art.

The functionalised data may comprise a combination of these approaches such as the result of a change point analysis applied to a said first or second derivative.

The curing completion time may be determined by detecting a reproducible characteristic of the functionalised data corresponding to a local maximum or minimum, steepest gradient, or inflection point in the power output vs. time. For example, the curing completion time may be determined by detecting a corresponding local maximum or minimum in a derivative, such as the first derivative, of heat output vs time data.

It has been observed that such a reproducible characteristic, such as a local maximum or minimum, occurs at a predictable time before curing is complete and so its detection can be used to predict the curing completion time. Accordingly, the method may comprise detecting a reproducible characteristic of the functionalised data (e.g. a local maximum or minimum in the first derivative) and predicting the curing completion time.

The method may comprise smoothing the heat output vs time data, either before or more after the functionalisation. Smoothing of the data may assist dealing with noise in the data. Detecting the reproducible characteristic may be performed on the smoothed data.

The method may for example comprise calculating a rolling average, example each point of the smoothed data being an average of a pre-set number of preceding data points. For example where data is collected every second or every ten seconds, each datum of the smoothed data (be that the heat output vs time data, or the functionalised data) may be an average of the preceding 5, or 10, or more data points.

The method may comprise acquiring data for an evaluation period and then averaging the acquired data. This may be repeated for one or more subsequent evaluation periods, such that each datum of the smoothed data is a smoothed data block that extends for an evaluation period in the time domain, and has a value of an average of the data acquired over the preceding evaluation period.

In some embodiments, the method comprises acquiring the first derivative (or higher order derivative, as the case may be) of the heat output vs time for an evaluation period, averaging the first derivative over the evaluation period to obtain a smoothed data block, and repeating until a reproducible characteristic is observed in the smoothed data.

The reproducible characteristic may for example be a smoothed data block having a first derivative value within a threshold range of zero.

In some embodiments, the reproducible characteristic may be a sequence of smoothed data blocks having values indicative of a local maximum or minimum.

A reproducible characteristic may be a local minimum of smoothed data blocks, which may for example be characterised by a data block having a first derivative value lower than the preceding and the following data blocks. Similarly, a local maximum may be characterised by a data block having a first derivative value higher than the preceding and following data blocks. A local minimum or maximum may be additionally or alternatively characterised by a data block having a first derivative value higher or lower than a threshold value.

Further criteria may be optionally applied when identifying a reproducible characteristic, for example whether the preceding and following data blocks are respectively higher/lower than a given data block by more than a predetermined amount; such as by more than 0.01, or more than 0.05. The method may comprise determining trends in a greater number of data blocks, for example where the derivative value decreases for two or more successive data blocks and subsequently increases for two or more successive data blocks (or vice versa).

The evaluation period may for example around 1 minute, 5 minutes or 10 minutes. The evaluation period may in some embodiments be around 9 minutes.

Advantageously, the evaluation period is only a relatively small proportion of the length of the standard cure cycle (such as a cure cycle recommended by a resin manufacturer to ensure complete curing). For example, the evaluation may be less than around 15% or 10%, or around 7.5% (or less) of a normal curing cycle, and thus provides for significant time savings.

The method may comprise providing more than one heat source and more than one temperature sensor (which together may be referred to as a "node").

In embodiments having multiple nodes, detecting or predicting the curing completion time may comprise identifying a reproducible characteristic in the data from more than one node.

The nodes may be grouped. The curing completion time for the group of nodes may in some embodiments be considered to have been identified only when a said reproducible characteristic has been identified in data from all of the nodes in a group.

In some embodiments, nodes in corresponding locations on opposed moulds may be paired, such that the curing completion time for the pair of nodes is considered to have been identified only when a said reproducible characteristic has been identified in data from both nodes.

The curing completion time may be predicted using a combination of the foregoing. The method may comprise refining a predicted curing completion time. For example, the curing completion time may be predicted based on detecting a reproducible characteristic, such as a local maximum or minimum in a derivative of heat output vs time data, and may be subsequently refined (or confirmed) based on the detection of a further reproducible characteristic, such as a derivative within a threshold range of zero for a predetermined period of time.

The curing completion time may be when the composite is known (e.g. from destructive testing, spectroscopic analysis, differential scanning calorimetry or any other suitable testing method) to be at least 90%, or 95% or at least 98% or 99% cured.

The method may comprise cooling the composite article based on the determined curing completion time.

The cooling may commence after the curing completion time.

The method may comprise commencing the cooling a predetermined time period after the curing completion time. For example, a predetermined time may be allowed to elapse following the curing completion time, before the composite article is cooled.

This may be required to ensure that curing is complete throughout the composite article, particular for large composite articles and/or where the heat source and temperature detection is external to the composite article. However, in some embodiments it has been found that the heat capacity of a composite article (even for relatively thick composite articles, comprising 20 or more plies of carbon fibre) is such that sufficient heat is stored to cure all parts of the article, even when cooling is commenced at the determined curing completion time.

In some embodiments, where the curing completion time has been predicted, the method may comprise commencing cooling before the curing completion time.

The cooling may be in accordance with a predetermined cure profile.

The composite article may be cooled by reducing the output of, or turning off, the heat source, and allowing the composite article to cool.

The heat output of the heat source may be regulated by closed loop control, such as PID control. The control may be effected by a processing resource, such as a computer processor running software of firmware. A processing resource may be local to the heat source, or the heat source may be controlled remotely (e.g. over a wireless or wired network). Indeed, the method may comprise use of a distributed processing resource.

The method may comprise detecting a temperature related property of a temperature sensor, e.g. an electrical signal such as a voltage, current, or resistance. Any suitable temperatures sensor may be used, such as a thermocouple or thermistor.

The method may comprise detecting or calculating a temperature from the temperature-related property.

The skilled addressee will understand that regardless of whether a temperature value is calculated, a temperature-related property can be correlated with temperature, so as to enable the predetermined temperature vs time profile (cure profile) to be followed.

The method may comprise detecting a temperature-related property at or within a curing tool. For example a temperature sensor may be attached to or embedded in a curing tool The method may comprise detecting a temperature-related property on a surface of or within a composite article. For example, a temperature sensor may be attached to a surface of or embedded within a composite article (e.g. during lay-up).

In some embodiments, the method comprises detecting a temperature-related property using the heat source. For example, a heating element can in some embodiments also function as a temperature sensor.

The method may comprise providing more than one heat source, any plurality of heat sources. The method may comprise the steps of detecting, regulating, monitoring and determining as described herein, in relation to each said heat source.

The method may be used with any suitable type of heat source, and may comprise inductively heating, resistively heating, radiatively heating and/or microwave heating the composite article.

A heat source may be provided embedded within or attached to a curing tool. A heat source may be embedded in or attached to the composite article. In some embodiments, the composite article may be electrically conductive and be directly resistively or inductively heated; in effect the composite article acting as a heat source.

For example, a composite article may comprise one or more conductive layers, such as reinforcing metallic members or mesh layers. Certain composites, including carbon fibre, are based upon a conductive reinforcing fibre.

A plurality of heat sources may be independently subject to closed loop control, as disclosed herein.

The method may comprise providing the composite article, for example comprising laying up fabric layers, impregnating with resin, debulking, preforming and other such steps for composite manufacture, known in the art. The method may comprise placing an uncured composite article on a curing tool and/or removing it therefrom after curing.

By a composite article we include an article formed from or comprising a reinforcing fibrous or particulate material and a curable matrix material. The reinforcing material can include a woven or non-woven fabric material, or alternatively reinforcing fibres may be dispersed within a matrix material. Any suitable reinforcing material, or combination of reinforcing materials, may be used, including carbon fibre, glass fibre, aramid, basalt, porous materials such as porous ceramics or plastics materials. Moreover the method may be applied to any suitable curable matrix material, including epoxy resins, polyester resins, vinylester resins, alkyd resins; and is equally applicable to exothermic or endothermic curing reactions.

Composite articles may also include other components embedded or encapsulated within or attached to the reinforcing material/curable matrix material, such as honeycomb structures or metallic couplings or reinforcements.

The method is of particular utility in the curing of carbon fibre composite articles, and can be used to cure articles composed of pre-impregnated or semi-impregnated carbon fibre fabric, or where resin is introduced following lay-up of the reinforcing fabric.

By a curing tool we refer to the apparatus used to cure a composite article, by heating. A curing tool typically comprises a mould defining a surface or surfaces of the composite article, which may be provided with a heat source(s)

as described herein. A curing tool may comprise more than one mould, commonly two opposed moulds; one or both of which may be heated.

Where we refer to detection of a temperature-related property proximal to the provision of a heat source, or a temperature sensor being proximal to a heat source, we mean spatially proximal, so that the temperature or temperature-related property is representative of or correlated to the effect of the heat source on the curing of a composite article in the vicinity of the heat source. Proximal includes in the same location, within the same unit or node and can also include one or other of the heat source or detection of a temperature-related property (e.g. by a temperature sensor) being in a curing tool and the other being in or of the composite article.

According to a second aspect of the invention there is provided curing apparatus for curing a composite article, the curing apparatus comprising;
 a curing tool, having at least one mould;
 a heat source for heating a said composite article;
 a temperature sensor for detecting a temperature-related property proximal to the heat source; and
 a control arrangement configured to;
  regulate the heat output of the heat source to the composite article, based at least in part on the detected temperature-related property, to a predetermined temperature vs. time profile;
  acquire heat output vs time data;
  functionalise the heat output vs time data; and
  determine a curing completion time based on the functionalised heat output vs time data.

The control arrangement may comprise one or more controllers, a processing resource and data storage.

The data storage may be used to store and retrieve acquired heat output vs time data, and/or functionalised data as described below. Experimental parameters such as cure profiles, look-up tables for known composites and the like may be stored on the data storage and retrieved therefrom.

The processing resource may be configured to functionalise the heat output vs time data. The invention is not limited to any particular software or hardware architecture, but may for example comprise one or more processing modules for functionalising, and otherwise processing the heat output vs time data.

A functionalising module may be configured to functionalise the heat output vs time data, for example to apply one or more mathematical functions to heat output vs time data, such as a first or higher order derivative, a square or higher power or any suitable mathematical processing suitable to enhance or exaggerate a characteristic of the heat output vs time data, as disclosed herein.

The processing resource may comprise a smoothing module. The smoothing module may smooth the heat output vs time data, or the functionalised data.

The smoothing module may be configured to calculate a rolling average of the heat output vs time data, or the functionalised data. The smoothing module may be configured to average acquired heat output vs time data, or functionalised data, over an evaluation period, or for one or more subsequent evaluation periods, wherein each datum of the smoothed data is a smoothed data block that extends for an evaluation period in the time domain, and has a value of an average of the data acquired over the preceding evaluation period.

The processing resource may comprise a characterising module, configured to determine the curing completion time, based on the functionalised data (which optionally has been smoothed). Determining the curing completion time may comprise identifying a reproducible characteristic of the functionalised data, as disclosed in relation to the first aspect.

The various modules may send or receive data from one another or the data storage, as required.

It will be understood that the processing resource may comprise a computer processor, or its functions may be performed by more than one computer processor, which may be local to a heat source, central to the curing apparatus, or provided remotely, across a network. Indeed the processing response may comprise more than one processor, such as a network of processors. The various modules disclosed herein may each be provided by a processor or more than one processor. The modules disclosed herein may be provided in the form of software executed on a processor or processors. Similarly, data storage may be local to a heat source, central to the curing apparatus, or data may be stored remotely, e.g. across a network.

The apparatus may comprise more than one, or a plurality of heat sources and temperature sensors. The apparatus may comprise a number or array of nodes, each node comprising a heat source and temperature sensor.

The curing tool may comprise said the or each heat source and temperature sensor. The curing tool may comprise said nodes.

The respective heat sources and temperature sensors may each be provided with a controller. Each controller may be operable independently as a control arrangement, operable to regulate, monitor and determine as disclosed herein. Alternatively, a control arrangement may be associated with more than one heat source or temperature sensor. For example, a control arrangement may be associated with a heat source and one or more neighbouring heat sources. A given heat source and/or temperature sensor, may be associated with more than one control arrangement. For example, a control arrangement may control a heat source, taking readings from a neighbouring heat source and/or temperature sensor into account.

Each node may comprise a control arrangement, or a processing resource or data storage; or form a part thereof. Each node may comprise a controller, such as a closed loop controller, e.g. a PID controller. Alternatively, such control may be exerted by a control arrangement common to more than one node, such as a central control arrangement.

The nodes may be networked together, for example in order to share a common data storage, processing resource, power supply and the like.

The mould may be composed of any suitable material. The mould may for example be metallic, of have a metallic mould surface. Alternatively, the mould may comprise a composite mould surface.

The or each heat source and/or temperature sensor may be attached to, recessed in or embedded in the mould. For example, a mould may have a heat source embedded close to the mould surface. In some embodiments, it may be convenient for a heat source or a node to be attached to a mould.

A curing tool may alternatively be configured to communicate with a heat source and temperature sensors, such as those embedded in or forming a part of the composite article itself.

The apparatus may comprise any suitable type or types of heat source, and may comprise a heat source for inductively heating, resistively heating, radiatively heating and/or microwave heating the composite article.

Conveniently, the heat source is a heating element. In some embodiments, the heating element can in some embodiments also function as a temperature sensor.

The apparatus may comprise more than one mould. For example the apparatus may comprise opposed moulds, such as an upper and a lower mould, each of which may be provided with one or more heat sources, temperature sensors or nodes, as the case may be.

Alternatively, the apparatus may comprise a single mould and an insulating cover.

The apparatus may be adapted to cure a composite article within an autoclave, but both the apparatus and the method is of particular utility in out of autoclave composite curing application. Accordingly, the curing tool may be an out of autoclave (OOA) curing tool, and the apparatus may comprise such additional equipment required for OOA applications, such as a vacuum bag, a vacuum pump and so forth.

The apparatus may comprise or be connectable to a user interface, in order to change parameters such as processing parameters, cure profile and the like.

The invention extends in a further aspect to a node for a curing apparatus, comprising a said heat source, temperature sensor and controller. Optionally the node comprises a processing resource, data storage and/or a closed loop controller. The node may be configured to interface with a control arrangement, such as a computer processor, operable to perform the method of the first aspect in conjunction with one or more nodes. The invention thus extends to a said control resource, and to computer executable programme code (stored in any suitable format) which may be run on a computing device to cause it to function as a control arrangement as disclosed herein.

The control arrangement may be configured to execute any or all of the features of the method of the first aspect. Indeed preferred or optional features of the each aspect of the invention correspond to preferred and optional features of the each other aspect of the invention.

DESCRIPTION OF THE DRAWINGS

Embodiments of the invention will now be described with reference to the following figures in which:

FIG. 1 shows (a) a schematic cross sectional view and (b)/(c) images of a test curing tool.

FIG. 8 shows (a) power vs time data and (b)-(d) smoothed first derivative of the power vs time data, for a selected node of the two sided tool of FIG. 7. Data for the corresponding node of the upper and lower tools is presented.

DETAILED DESCRIPTION OF EXAMPLE EMBODIMENTS

A one-sided test tool was used to obtain data on curing of test composite articles, to demonstrate the principles of the invention.

Figure 1A:
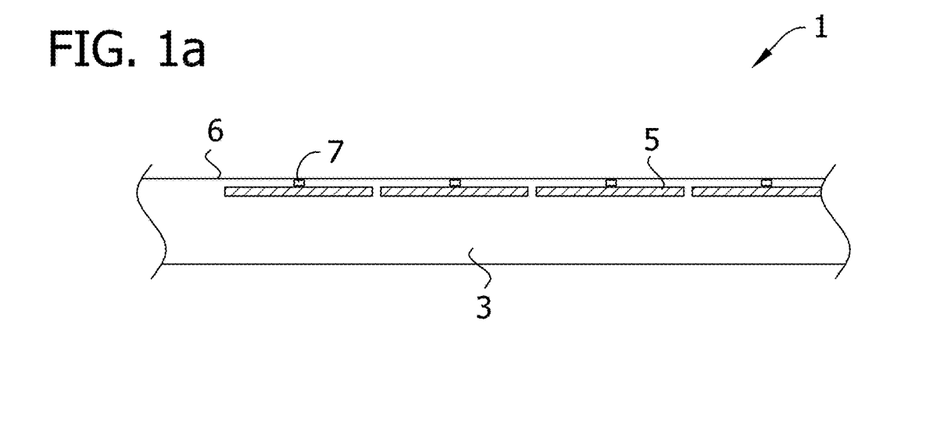
Figure 1B:
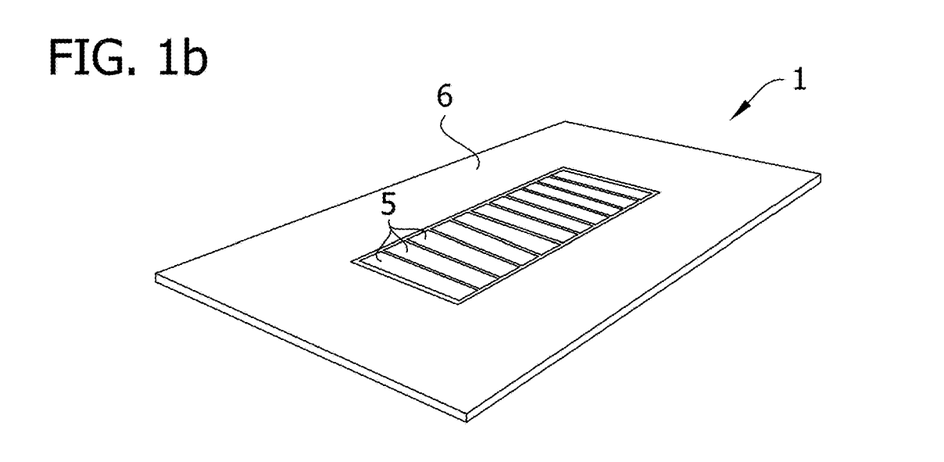
Figure 1C:
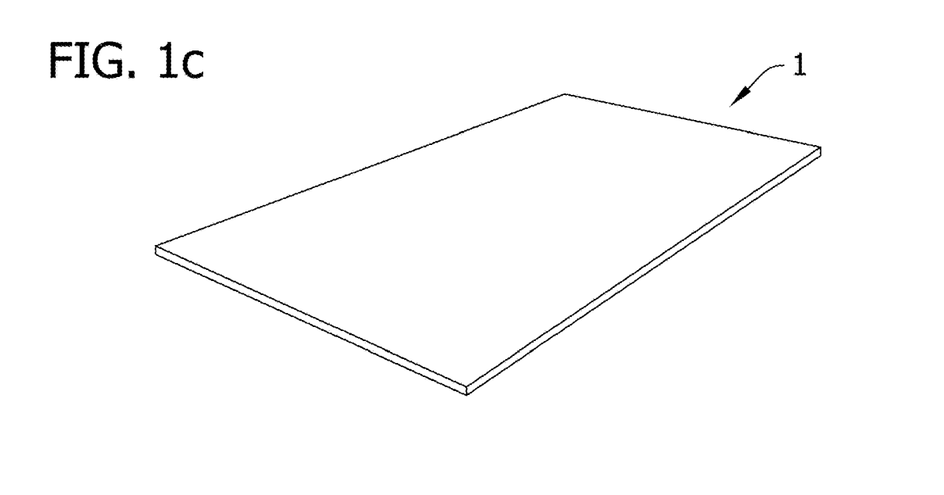

A test curing tool is shown in FIG. 1(a)-(c). The tool 1 is formed of a glass fibre plate 3 (a mould), to act as a mould for curing a test composite article, with heat sources in the form of eleven embedded silicon heater pads 5 (an example of a heat source) and eleven corresponding thin film PT100 resistive temperature sensors 7 (also referred to as resistive temperature detectors, RTDs).

As shown in the schematic cross sectional view of FIG. 1(a), the heater pads 5 and the RTDs 7 are located close to the mould surface 6 of the plate 3. The RTDs 7 are centred above each heater pad 5 to facilitate regulation of the heat output of the respective pad. The selected RTDs provide an accurate and repeatable resistance signal that can be related to temperature (i.e. resistance of the RTD 7 being a temperature-related property) within the target temperature range of 0-200° C. associated with curing of epoxy resin-based carbon fibre composites.

The position of the heat sources is marked on the mould surface 6 (see FIG. 1(b)). FIG. 1(c) shows the tool 1 after a protective PTFE layer has been applied to the mould surface to assist in release of the composite articles during testing.

The plate consists of 16 plies of woven glass fibre infused with an epoxy resin. Glass fibre was selected to prevent electrical shorting of embedded components during manufacture. The heater pads 5 and RTDs 7 are located 1 ply below the heating surface, so that thermal changes within a composite article in the tool 1 can be detected quickly and accurately.

In the embodiment shown, an individual heater pad surface measured 25.4×127 mm and 0.2 mm thick, creating a 127×289.4 mm total surface area with 1 mm gap between adjacent pads. The pads were rated at 1.6 W/cm$^2$ and used a 240V AC supply.

Each of the heater pads 5 and corresponding RTDs 7 is connected to a respective microcontroller located on the underside of the tool 1 (not visible in FIG. 1). In effect, therefore, the tool 1 comprises a series of nodes 2 formed from a heat source, temperatures sensor and, in this embodiment, a microcontroller.

Figure 2:
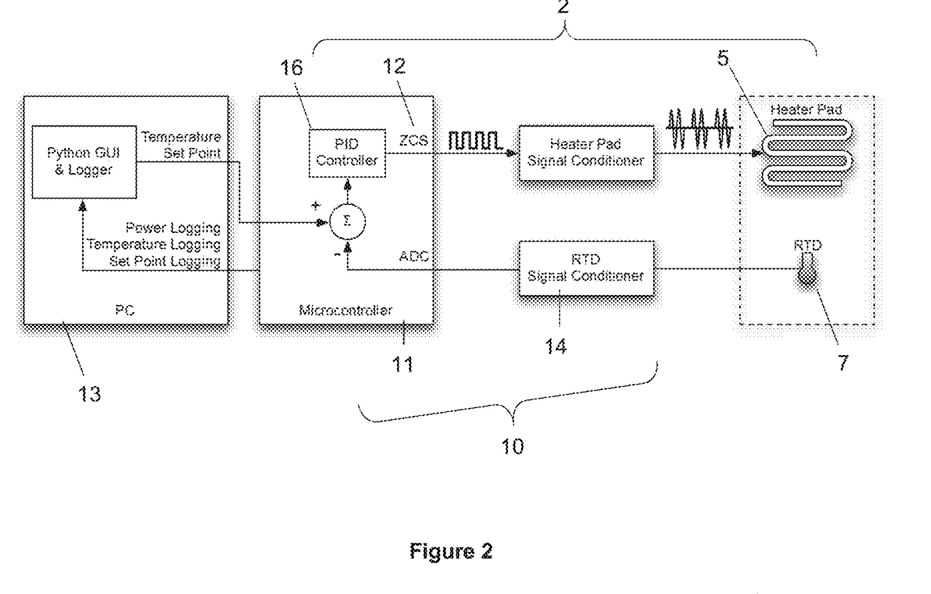
FIG. 2 is a schematic of the architecture of a control arrangement that communicates with a heat source and temperature sensor of a curing tool.

The architecture of each node 2 is shown in FIG. 2. The control arrangement includes a microcontroller and the relevant software running on a computer processor. The microcontroller 11 is configured to implement Proportional-Integral-Derivative (PID) control to regulate the output of the corresponding heat source 5. The microcontroller 11 schedules the supply of AC power to the heater pad 5 based on feedback from the RTD 7. This is a form of closed loop control, but other means of closed loop control may also be used.

Each node 2 communicates with a processing resource 13, which, in the embodiment shown is in the form of a PC connected via a Universal Serial Bus (USB) interface. The PC is provided with a Graphical User Interface (GUI), by which a user is able to define a cure profile (i.e. a temperature vs time profile) that is then communicated to and locally stored at each individual microcontroller 11.

In use, and as described in further detail below, each microcontroller is operable to regulate the heat output of its heat source, to follow this predetermined cure profile. The cure profile creates a series of temperature set points over time for the microcontroller 11 to drive the heater pads 5 to. The RTD temperature, power consumption and PID values are logged to .csv files, which are stored on the PC.

The microcontrollers used are 8-bit Atmel ATMega 328 with five Analogue-to-Digital Converters 10 (ADC) and five pulse width modulation (PWM) outputs. Although in the embodiment shown each microcontroller 11 is associated with a single temperature sensor 7 and heat source 5, multiple inputs and outputs providing the ability to implement multiple zone controllers with the same microcontroller, in alternative embodiments.

The embedded ADCs are single-ended successive approximations and their channels are multiplexed. They provide 10-bit resolution with an absolute accuracy of 2 Least Significant Bits (LSB).

The power supplied to each of the heater pads 5 is regulated using a zero crossing detector circuit. When the AC sine wave crosses the 0 V axis, a 1 mV pulse is sent from a zero crossing optocoupler or scheduler (ZCS) 12 to the microcontroller 11. The ZCS 12 regulates the AC supply to the heater pad 5 based on a duty cycle determined by the microcontroller 11. The number of pulses can be tracked and the power supply can be turned on and off in for different periods of time, in a similar method to pulse width modulation.

The ADC 10 of the microcontroller 11 is single-ended and utilizes a signal conditioner 14 that consisted of three parts:
  Constant current source to bias the RTD with a constant current of 1 mA to prevent self-heating which could disrupt the temperature-resistance relationship.
  Bridge to compensate for wire heating effects connected to the RTD.
  Amplification stage to amplify the bridge output for better voltage per ADC value (0-1023) on the microcontroller.

The microcontroller's PID compares the current temperature of the RTD to the set point at a given time. Depending on the error margin, the PID sends an appropriate zero-scheduling signal to the heater pad driver circuit. The PID was tuned using the Zeigler-Nichols method using no overshoot parameters. $K_i$ and $K_d$ were set to 0 and $K_d$ was increased until the system oscillates around the set point with constant amplitude of $K_u$ and an oscillation period of $T_u$.

$K_u$ is the proportional gain coefficient used during the tuning process, and is the value of the proportional coefficient ($K_p$) that is found to produce a constant oscillation around a given set point when the integral coefficient ($K_i$) and the derivative coefficient ($K_d$) are set to zero.

$T_u$ is the oscillation period corresponding to a proportional gain coefficient of $K_u$ From the values of $K_u$ and $T_u$, the true $K_p$, $K_i$ and $K_d$ values were derived using set ratios as described in the Zeigler-Nichols method. This was used to establish baseline PID coefficients ($K_p$, $K_i$, $K_d$) which could then be adjusted by the global controller based on experimental analysis.

Gain scheduling was used to adjust PID gains depending on the current setpoint. For example when the temperature of the plate was similar to the ambient temperature, less aggressive PID values were required to track the set point. In use of the tool 1, as temperature increases, the temperature difference between the plate and the surrounding atmosphere increases, requiring more aggressive PID values to be able to track the set point.

The PID controller 16 was able to maintain the set point temperature within ±0.5° C. This degree of accuracy was observed for all 11 zones or nodes within the tool 1.

EXPERIMENTAL

The following methodology was used for all experiments.
Test Composite Articles
  Test composite articles were prepared as follows: Aerospace grade woven pre-preg carbon fibre was used to create 18 ply thick 127×289.4 mm panels. 18 plies were used to create a part with a representative thickness of an aerospace component.

The selected pre-preg carbon fibre required a cure profile comprising a temperature ramp of 3° C./min from ambient to 180° C., followed by a dwell period at this temperature.

Figure 3:
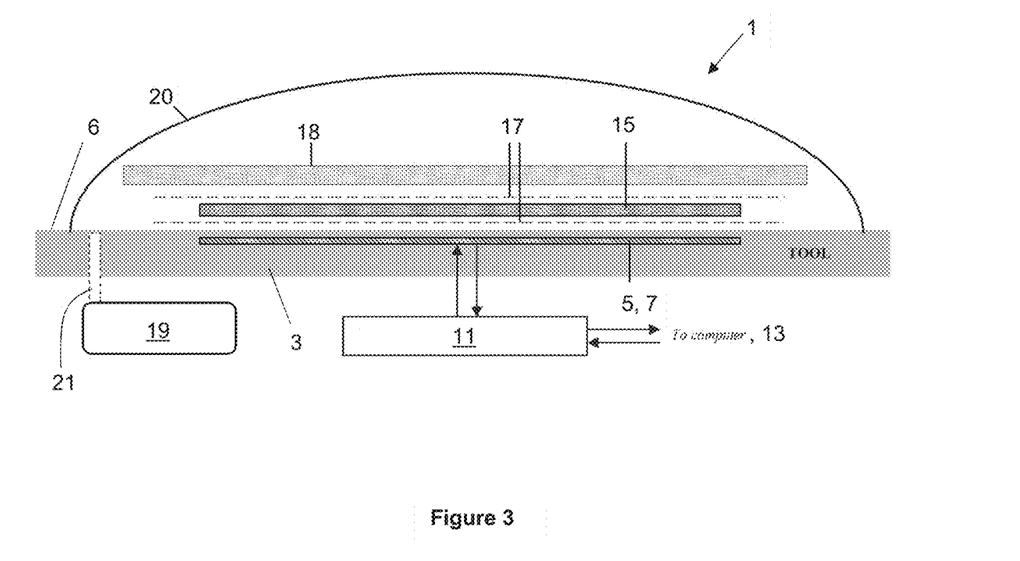
FIG. 3 is a schematic cross section of the tool layup of a curing tool.

Following lay-up, the panels were stored in a laboratory freezer within vacuum bags and were removed 24 hours before curing to allow complete defrosting.
Panel Positioning and Instrumentation
  The apparatus setup for curing a test panel 15 (collectively known as the "tool layup") is shown in FIG. 3.

A panel 15 is centered on the curing tool 1 and encased in two layers of PTFE "peel paper" 17, to prevent bonding to the mould surface 6 of the tool 1.

For the purposes of the test experiments, two RTDs was taped using PTFE coated release film on the top surface of the panels, to provide temperature measurements for the top surface of the plate. These are not shown in the figures.
Cure Layup
  Curing of the panel requires application of a 99% vacuum, to minimise voids and to compress the carbon fibre layup.

A layer of woven polymer breather 18 was placed over the test panel 15 to facilitate air flow, and a flexible vacuum "bag" 20 placed over the test panel and breather so as to contact the mould surface 6 around the periphery of the test panel 15. A tube 21 connects between the vacuum bag 17 and a vacuum pump 19.
Curing
  After vacuum was applied, each test panel 15 was cured using the cure profile shown in FIG. 4; i.e. an initial equilibration period at 30° C., a 3° C./min temperature ramp to 180° C., a dwell time of 120 minutes and a temperature ramp of −3° C./min to 30° C., after which the apparatus was switched off and allowed to cool for 4 hours.

Small core samples were removed from each test panel following curing, which were subject DSC analysis to verify that ≥99% curing had taken place, and the cure profile was then repeated for each test panel to obtain comparative data.

The experimental protocol was conducted on six test panels to assess repeatability.

Figure 5:
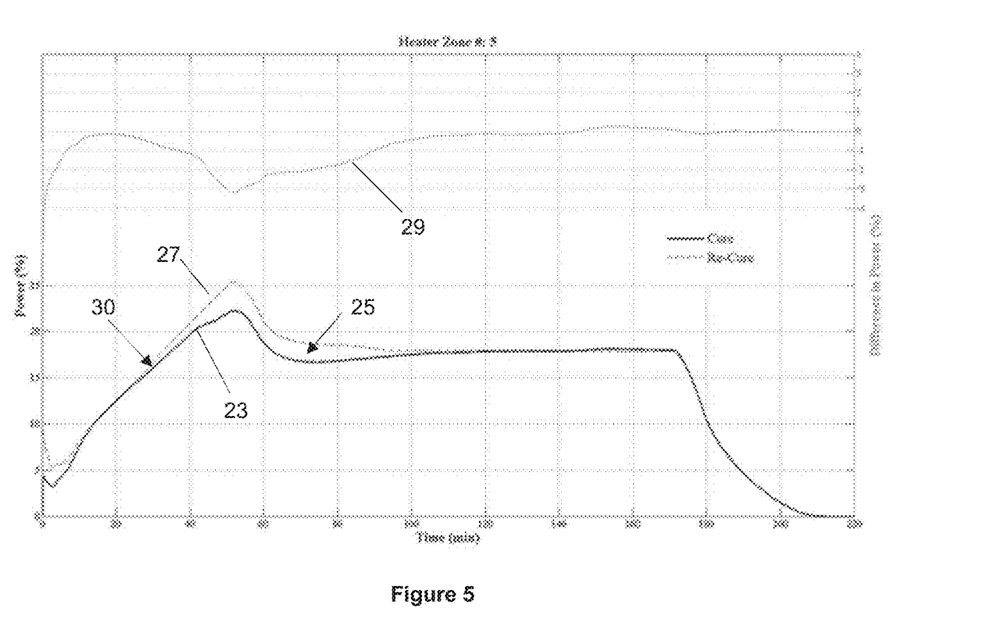
FIG. 5 shows power vs time data for a node of a test curing tool during a cure cycle and a re-cure cycle. A difference plot between the two cycles is also shown.

MATLAB (a trademark of MathWorks, Massachusettes, USA) was used for data analysis and visualisation. The data from each RTD was separated and displayed on 11 different graphs, representing the different heater nodes. For the purposes of following, data for individual nodes will be presented.
Results
  An example of the power consumption over time of the heat source of a single node during the cure and then re-cure is shown in FIG. 5. The power signals were averaged over 1000 data points using a moving Savitzky-Golay filter (i.e. smoothed data is presented).

For the cure cycle (solid line 23), the power output of the heat source is presented as a percentage of maximum output. Data for heater number 4 is presented in the figure, but comparable data were obtained for other the heaters. Power output initially settles during the equilibration period at 30° C.

During the temperature ramp at 3° C./min, the power steadily increases until peaking at approximately 22% at t=55 mins.

As expected, the power output to maintain the temperature during the dwell period at 180° C. was lower than that required during the temperature ramp.

The power output passes through a local minimum 25 at t=78 mins and then rises towards a steady rate of around 17.5% at t=120 mins, where it remains for the rest of the dwell period. The power consumption then during temperature ramp down at −3° C./min.

During the re-curing cycle (dotted line 27), the power output is initially higher the cure profile power consumption and continues to diverge. The power output peaks at 25% at t≈22 min, before falling towards a same steady state of around 17.5% at t≈120 min. Thereafter, power output is as during the cure cycle.

Unlike the power output during the cure cycle, power output during the re-cure cycle did not pass through a local minimum.

DSC analysis on the core samples extracted following the cure cycle confirmed that all tested regions of the test panels were at least 99% cured.

The difference between the power outputs during the cure and the re-cure cycles is shown by line 29 in FIG. 5. This divergence between the power outputs during the cure cycle and re-cure cycle can therefore be attributed to heat liberated by the exothermic epoxy resin curing reaction within the test panel. The required power output to follow the predetermined temperature vs time profile during the re-cure cycle can be regarded as that expected for heating an article having analogous conductivity and heat capacity, taking into account heat losses to the environment for this particular experimental setup.

The initial divergence evident from around t≈22 mins and characterised by a faint shoulder 30 in line 23, is attributable to the onset of the thermally initiated curing reaction. In further experiments (data not shown) a slower temperature ramp rate was used and the onset of curing manifested as a "double minimum" was observed in the power output during curing.

Whilst absolute power output varied, due to differences in heating element power rating, RTD accuracy and increased heat loss near the edges of the test panels (evident in data from nodes 1 and 11 in particular), the difference between cure and re-cure cycles illustrated in FIG. 5 was observed for all nodes in experiments conducted on each of the six test panels.

These data indicate that the exothermic response provides a reproducible characteristics that may be tracked. Two such reproducible characteristics are the approach towards constant power output at t≈120 minutes and the local minimum observed in the test experiments at t≈78 minutes.

Detecting the constant power output of the heat source and/or the approach thereto, is complicated by the differences between absolute power output when this steady state is achieved, due to the aforementioned differences in heat loss from different areas of the tool.

However, the constant power output is characterised by the first derivative of heat output vs time data approaching zero, regardless of these absolute values and can be used to determining the curing completion time.

Figure 6:
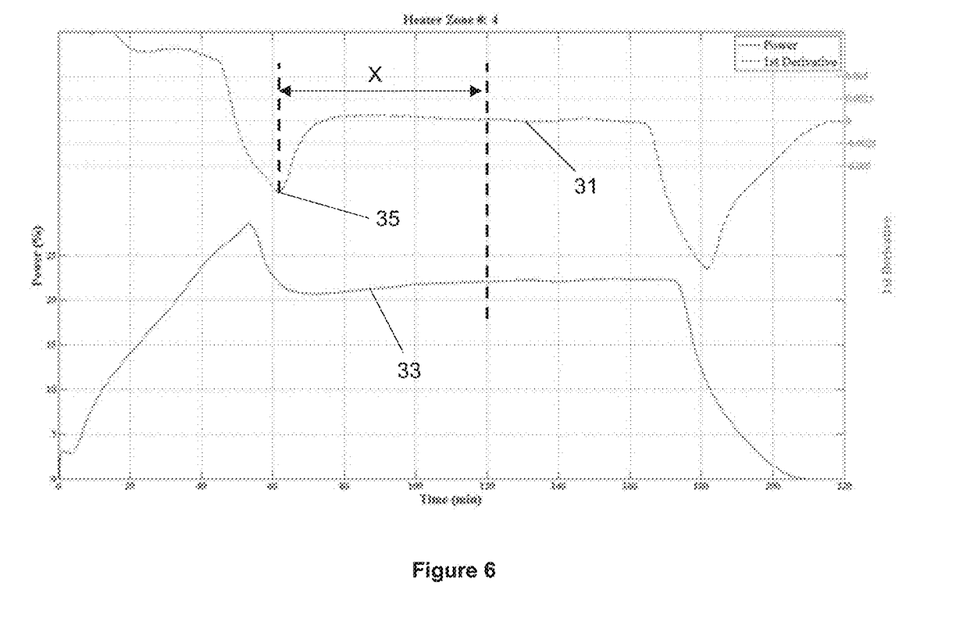
FIG. 6 shows power vs time data for another node of the test curing tool during a cure cycle, together with smoothed first derivative data.

An example of the first derivative of heat output vs time data (an example of functionalised data) is shown in FIG. 6, by line 31. For comparative purposes, the heat output vs time data from which line 31 was obtained, is shown as line 33. Qualitatively similar results were obtained for all 11 nodes, and indicates that this approach to a first derivative of zero, during a dwell period can be used as a reproducible characteristic for determining the curing completion time.

It has also been observed that the local minimum 35 in the first derivative, at t≈62 minutes (corresponding to the steepest gradient of the heat output vs time 33 between the local maximum 37 and the local minimum 35) is also a suitable reproducible feature of the first derivative of heat output vs time data.

In addition, it has been observed that the time X between the local minimum 35 and the curing completion time (shown at t=120 minutes in this example) is also reproducible, such that detection of the local minimum, in this example at around 62 mins, can be used to predict when the curing completion time will occur. i.e. In this case, X is around 58 minutes.

Two-Sided Test Tool

Experiments were also conducted using a further embodiment of a curing tool 101. Features in common with the tool 1 are provided with like reference numerals, incremented by 100 and 200 for the respective moulds. The tool 101 comprises both an upper mould 103 and a lower mould 203, each of which have an array of 25 nodes 102, 202; as shown schematically in FIG. 7. As previously, each node 102, 202 has a heat source 105, 205 and a temperature sensor 107, 207.

Figure 7:
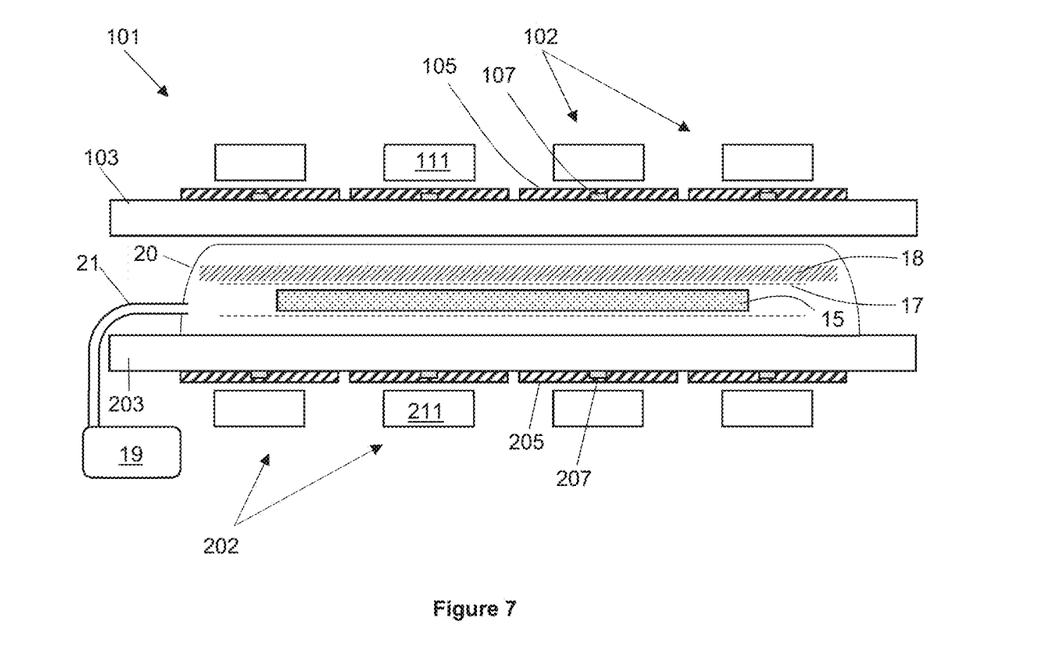
FIG. 7 shows a schematic cross sectional view of the tool layup of a two-sided curing tool.

Each mould 103, 203 was constructed generally as described above in relation to the mould 3. However, unlike the mould 3 of the one sided tool 1, both the heat sources 105, 205 and the temperature sensors 107, 207 (as well as their respective microcontrollers 111, 211) of each node 102, 202 was attached to the outer face of the tool the temperature sensor and heater element, to facilitate repair/replacement.

Figure 8:
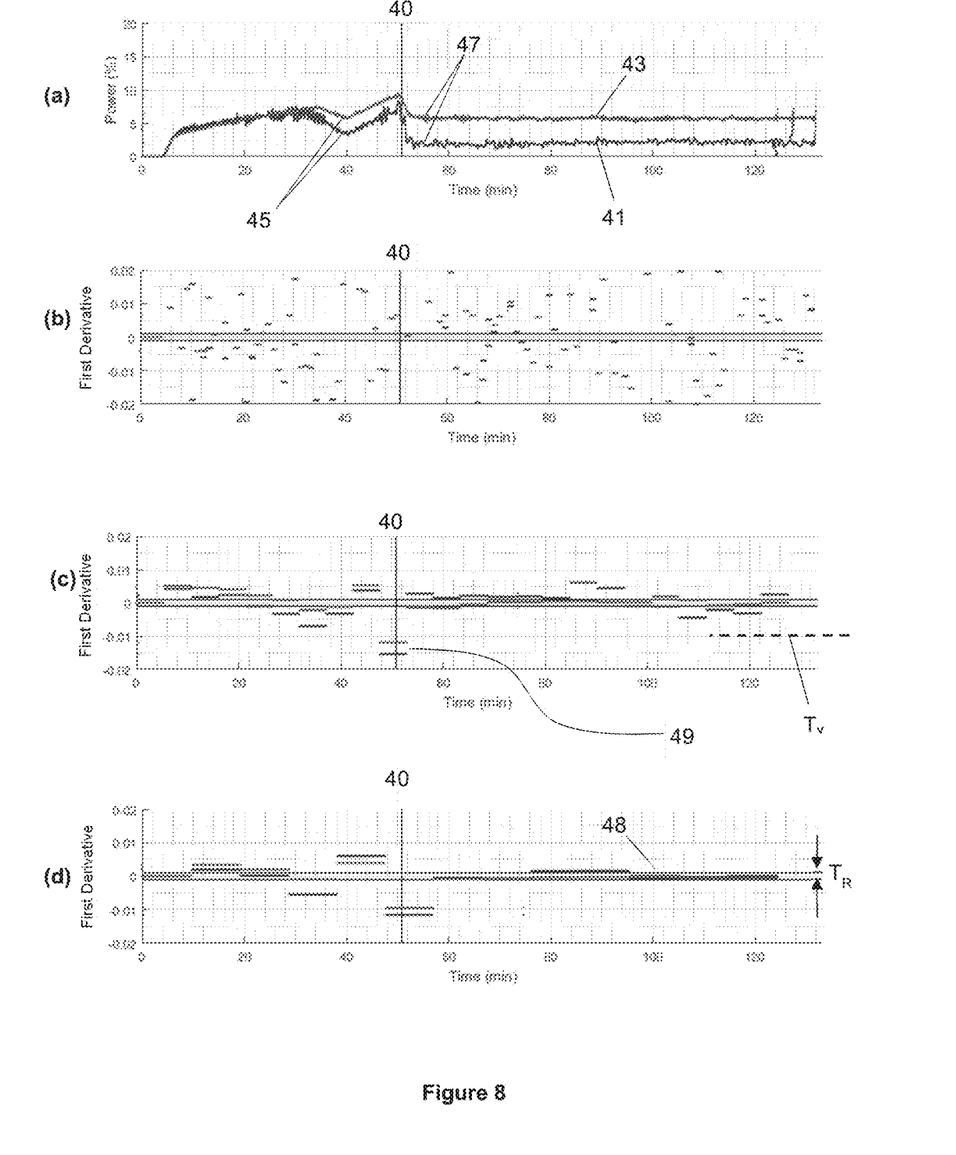

Heat output vs time data for node 17 of the lower mould 203 and data for the upper mould 103 is shown in FIG. 8. Comparable results were obtained from the remaining nodes of both moulds 103, 203.

FIG. 8(*a*) shows raw heat output vs time data (presented as % of maximum power of the heater pad). FIGS. 8(*b*)-(*d*) show smoothed first derivative data, in which the raw data has been averaged for an evaluation period of (b) 1 minute, (c) 5 minutes and (d) 9 minutes. The resulting smoothed data is presented as data blocks each of which has a value of the average extends for an evaluation period in the time dimension. The cure profile was as described above and the start of the dwell period is marked by line 40.

By virtue of the reduced heat losses from the use of both upper and lower moulds 103, 203, the heat output vs. time data (FIG. 8(*a*)) for node 17 of the lower mould (line 41) and the upper mould (line 43) each equilibrate towards the end of the dwell period at a much lower power than for the nodes of the one sided tool 1 discussed above. The heat source of node 17 of the lower mould 103 equilibrates at around 2.5% of its maximum power, and the heat source of the node 17 of the upper mould 203 equilibrates at about 5% of its maximum power.

A further consequence of the use of two moulds is that overall heat output form the nodes is lower such that a "double minimum" is observed in the heat output vs time data. A first minimum 45 occurs during the temperature ramp, and arises from heat liberated following the thermal initiation of the curing reaction, and the second local minimum 47 results from heat liberated by the curing reaction during the early stages of the dwell period.

The curing completion time for node 17 was determined from the smoothed first derivative data shown in FIG. 9(*d*) as follows. The reproducible characteristic was the approach of the first derivative of heat power output towards zero, and curing completion time was determined as when data blocks from both the upper and lower nodes fell within a threshold range of zero.

In this instance, the threshold range $T_r$ was set at ±0.001, which is correlated to ≥99% completion of the curing reaction. In the example shown, the curing completion time was determined at the data block centred at t=100 minutes, marked with reference numeral 48. For manufacturing applications, this would enable this node to be cooled on or after this time. It will be understood that for some applications, a further 1-2 evaluation periods may be allowed to elapse before cooling—for example to allow determination of the curing completion time at other nodes.

Figure 4:
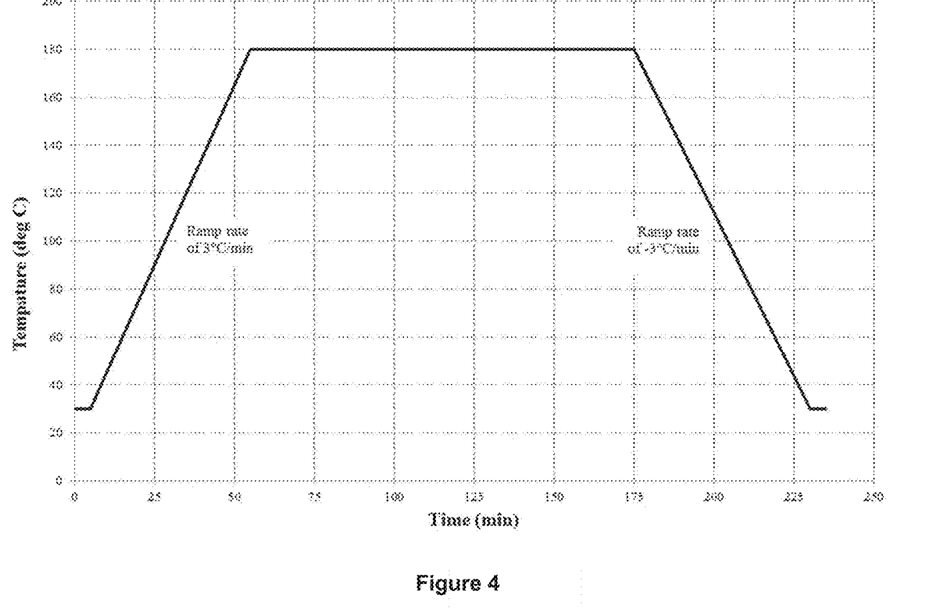
FIG. 4 is an example cure profile.

In any case, by identifying the curing completion time in this way, the heating may be discontinued far earlier than the t=175 minutes used in the standard cure profile (FIG. 4).

The threshold value of the first derivative depends primarily on the acceptable percentage completion of the curing reaction and was selected to be particularly low in the test experiments, so as to be representative of the requirements for aerospace applications. The length of the evaluation period will be dependent on experimental conditions, and in particular on the amount of noise in the data.

The evaluation period was determined through analysis of cure cycle temperature and power data from experiments using the same resin system and cure cycle. The power consumption was analysed over the time series and changes in the different cure cycle stages were observed to align with changes in the first order derivative.

Experiments were selected with heater pad and temperature sensor pairs that produced a temperature set point tracking with a standard deviation of less than 1.5° C.

The temperature profiles were used to filter the power consumption profiles by normalising the oscillations in power consumption based on the deviations of temperature from the set point. This was conducted on different time periods until the power consumption standard deviation was reduced to within 5% of rated power for the profile. The optimal time period for the particular resin system described above was found to be 9 mins. Accordingly, the evaluation period can be quantitatively or semi-quantitatively determined from noise or s/n in the temperature data.

The curing completion time for node 17 was also determined from the smoothed first derivative data shown in FIG. 9(*c*) as follows. The reproducible characteristic was the local minimum of the first derivative of heat power output (corresponding to the local minimum 47 of the raw power vs time data shown in FIG. 8(*a*)). It was found to be possible to identify the local minimum by a data block from both upper and lower moulds having a first derivative value below a threshold value $T_v$, in this case of <0.01, wherein the preceding and following data blocks have higher first derivative values. These criteria were satisfied for the data blocks centred at t=47.5 minutes (marked with reference numeral 49).

Thus, by t=58 minutes (reference numeral 51), the local minimum 49 could be identified, and from this the curing completion time predicted, as being a known time period (+50 minutes) from the identified local minimum in the smoothed first derivative.

It should be noted that the local minimum 45 could also be identified at t=46 minutes, by identifying a trend in the first derivative values of successive data blocks, applying a criterion of two successive falls followed by two successive increases.

FIG. 9(*a*) illustrates that the evaluation period must be selected to be suitable for the amount of noise present in the raw power vs time data. In this example, an evaluation period of 1 minute was not sufficient for the smoothed data to be sufficiently stable for reproducible characteristics to be identified.

It is to be understood that the embodiments of the method and apparatus described above are illustrative examples of the invention and that numerous modifications may be made by one skilled in the art without departing from the scope of the appended claims.

The invention claimed is:

1. A method of curing a composite article comprising a reinforcing material and curable matrix material, the method comprising;
   providing a heat source for heating the composite article;
   detecting a temperature-related property proximal to the heat source;
   regulating the heat output of the heat source to the composite article, based at least in part on the detected temperature-related property, to a predetermined temperature vs. time profile;
   acquiring heat output vs time data;
   functionalising heat output vs time data;
   determining a curing completion time based on the functionalised heat output vs time data; and
   curing the composite article by regulating the heat output of the heat source until the curing completion time.

2. The method according to claim 1, wherein the heat output is a value of an electrical current or power supplied to the heat source.

3. The method according to claim 1, wherein the functionalizing comprises applying one or more mathematical functions to the heat output vs time data.

4. The method according to claim 1, comprising identifying a reproducible characteristic of the functionalised heat output vs time data, and determining the curing completion time based on the reproducible characteristic.

5. The method according to claim 1, comprising identifying a reproducible characteristic of the functionalised heat output vs time data, and predicting the curing completion time based on the reproducible characteristic.

6. The method according to claim 1, wherein the functionalised heat output vs time data is a first derivative of the heat output vs time data.

7. The method according to claim 6, wherein the curing completion time is determined by detecting when the first derivative remains within a threshold range of zero for a predetermined period.

8. The method according to claim 7, wherein the threshold range is within ±0.1, within ±0.01, or within ±0.001 of zero.

9. The method according to claim 6, wherein the curing completion time is determined by detecting a local maximum or minimum in the first derivative of the heat output vs time data.

10. The method according to claim 1, comprising smoothing the heat output vs time data, either before or more after the functionalisation.

11. The method according to claim 10, comprising calculating a rolling average of the heat output vs time data or the functionalised heat output vs time data.

12. The method according to claim 11, wherein the evaluation period is around 5 minutes or around 9 minutes.

13. The method according to claim 10, comprising acquiring heat output vs time data, or functionalised heat output vs time data, for an evaluation period and then averaging said acquired data.

14. The method according to claim 13, comprising acquiring the first derivative of the heat output vs time data for an evaluation period, averaging the first derivative vs time data over the evaluation period to obtain a smoothed data block, and repeating until a reproducible characteristic is observed in the smoothed data.

15. The method according to claim 14, wherein the reproducible characteristic is a smoothed data block having a first derivative value within a threshold range of zero.

16. The method according to claim 14, wherein the reproducible characteristic is a sequence of smoothed data blocks having first derivative values indicative of a local maximum or minimum.

17. The method according to claim 1, comprising providing more than one node, each node comprising a heat source and a temperature sensor.

18. The method according to claim 17, wherein the determining the curing completion time comprises identifying a reproducible characteristic in the data from at least one of the more than one node.

19. The method according to claim 18, wherein the more than one node includes at least one pair of nodes, and the curing completion time for each of the at least one pair of nodes is determined only when the reproducible characteristic has been identified in the data from both nodes in the at least one pair of nodes.

20. The method according to claim 1, comprising cooling the composite article based on the determined curing completion time, wherein the composite article comprises carbon fibre composite.

21. The method according to claim 1, wherein the method is an out-of-autoclave method of curing.

22. The method according to claim 1, wherein said regulating the heat output over time comprises adjusting power output to the heat source by closed loop to heat the composite article according to the predetermined temperature vs. time profile, wherein said acquiring heat output vs time data comprises acquiring a measurement of the power output to the heat source over time, wherein said functionalizing the heat output vs time data comprises functionalizing the measurement of the power output to the heat source over time, and wherein said determining the curing completion time comprises determining the curing completion time based on the functionalized measurement of the power output to the heat source over time.

* * * * *